US012812288B2

(12) United States Patent
Zhang et al.

(10) Patent No.: US 12,812,288 B2
(45) Date of Patent: Nov. 24, 2026

(54) EARPHONES

(71) Applicant: SHENZHEN SHOKZ CO., LTD., Shenzhen (CN)

(72) Inventors: Chenxi Zhang, Shenzhen (CN); Zhiqing Liu, Shenzhen (CN); Haochen Liu, Shenzhen (CN); Lei Zhong, Shenzhen (CN); Cai Hu, Shenzhen (CN)

(73) Assignee: SHENZHEN SHOKZ CO., LTD., Shenzhen (CN)

(*) Notice: Subject to any disclaimer, the term of this patent is extended or adjusted under 35 U.S.C. 154(b) by 125 days.

(21) Appl. No.: 18/900,585

(22) Filed: Sep. 27, 2024

(65) Prior Publication Data

US 2025/0024190 A1 Jan. 16, 2025

Related U.S. Application Data

(63) Continuation of application No. PCT/CN2022/134434, filed on Nov. 25, 2022.

(51) Int. Cl.
*H04R 1/10* (2006.01)

(52) U.S. Cl.
CPC .......... *H04R 1/1066* (2013.01); *H04R 1/105* (2013.01)

(58) Field of Classification Search
CPC .............................. H04R 1/1066; H04R 1/105
USPC .......................................... 381/328, 380–381
See application file for complete search history.

(56) References Cited

U.S. PATENT DOCUMENTS

| | | | | |
|---|---|---|---|---|
| 6,009,183 | A | 12/1999 | Taenzer et al. | |
| 2005/0012893 | A1 | 1/2005 | Yamamoto | |
| 2022/0095029 | A1* | 3/2022 | Zheng | H04R 1/1008 |
| 2023/0028541 | A1* | 1/2023 | Wang | H04R 1/105 |

FOREIGN PATENT DOCUMENTS

| | | | |
|---|---|---|---|
| CN | 202931524 | U | 5/2013 |
| CN | 206472268 | U | 9/2017 |
| CN | 207235052 | U | 4/2018 |
| CN | 209767790 | U | 12/2019 |
| CN | 111883124 | A | 11/2020 |

(Continued)

OTHER PUBLICATIONS

International Search Report in PCT/CN2022/134434 mailed on Aug. 9, 2023, 7 pages.

(Continued)

*Primary Examiner* — Suhan Ni
(74) *Attorney, Agent, or Firm* — METIS IP LLC

(57) ABSTRACT

An earphone is provided. The earphone comprises a core module, a hook structure, and an adjustment mechanism. The core module is configured to contact a front side of an ear of a user. At least a portion of the hook structure is configured to be hung between a rear side of the ear and the head of the user. The adjustment mechanism is configured to connect the core module and the hook structure. The adjustment mechanism enables the core module to cover at least a portion of a cavity of auricular concha of the ear without blocking an external ear canal of the ear in a wearing state, to allow the core module to cooperate with the cavity of auricular concha of the ear to form an acoustic cavity. The acoustic cavity connects a sound outlet hole of the core module and the external ear canal of the ear.

20 Claims, 14 Drawing Sheets

(56) References Cited

FOREIGN PATENT DOCUMENTS

| | | | |
|---|---|---|---|
| CN | 217159952 | U | 8/2022 |
| JP | H1056698 | A | 2/1998 |

OTHER PUBLICATIONS

Written Opinion in PCT/CN2022/134434 mailed on Aug. 9, 2023, 5 pages.
The Extended European Search Report in European Application No. 22966258.0 mailed on Apr. 22, 2025, 14 pages.

* cited by examiner

EARPHONES

CROSS-REFERENCE TO RELATED APPLICATIONS

This application is a continuation of International Application No. PCT/CN2022/134434, filed on Nov. 25, 2022, the entire contents of which are hereby incorporated by reference.

TECHNICAL FIELD

The present disclosure relates to the technical field of electronic devices, and in particular to earphones.

BACKGROUND

With the widespread adoption of electronic devices, the electronic devices have become indispensable tools for social interaction and entertainment in our daily lives. Consequently, the demands placed on electronic devices have steadily increased. Among these electronic devices, earphones have found extensive use in everyday life. The earphones can be paired with terminal devices such as mobile phones and computers to deliver an auditory experience for users. From an operational perspective, earphones can generally be categorized into air-conduction and bone-conduction earphones. Regarding how users wear them, earphones can be divided into over-ear headphones, ear-mounted earphones, and in-ear earphones. Additionally, considering the connection manner, earphones can be grouped into wired and wireless types. Specifically, ear-mounted earphones are typically designed to hang on users' ears and usually need to be securely clamped with a certain level of force to ensure stable wearing. However, due to the varying shapes, sizes, and other dimensional differences in users' ears, several technical challenges may arise, such as discomfort, instability, and poor acoustic performance when earphones are worn by different individuals.

SUMMARY

Some embodiments of the present disclosure provide an earphone. The earphone may comprise a core module, a hook structure, and an adjustment mechanism. The core module may be configured to contact a front side of an ear of a user. At least a portion of the hook structure may be configured to be hung between a rear side of the ear and the head of the user. The adjustment mechanism may be configured to connect the core module and the hook structure. The adjustment mechanism enables the core module to cover at least a portion of a cavity of auricular concha of the ear without blocking an external ear canal of the ear in a wearing state, so as to allow the core module to cooperate with the cavity of auricular concha of the ear to form an acoustic cavity. The acoustic cavity may be configured to connect a sound outlet hole of the core module and the external ear canal of the ear.

The beneficial effects of the present disclosure include the following content. The present disclosure uses the adjustment mechanism to enable the core module to cover at least a portion of the cavity of auricular concha of the ear without blocking the external ear canal of the ear in the wearing state, so as to allow the core module to cooperate with the cavity of auricular concha of the ear to form the acoustic cavity. The acoustic cavity is configured to connect the sound outlet hole of the core module and the external ear canal of the ear. In this case, a sound transmitted through the sound outlet hole of the core module is limited by the acoustic cavity, such that the sound is more transmitted to the external ear canal of the ear, thereby improving the volume and sound quality of the sound heard by the user in a near field, and thus improving the acoustic effect of the earphone. In addition, different users can adjust the relative position of the core module on the ear through the adjustment mechanism in the wearing state, such that the core module is located at a suitable position, the core module better covers a portion of the cavity of auricular concha of the ear without blocking the external ear canal of the ear, and the user can also adjust the earphone to a more stable and comfortable position through the adjustment mechanism in the wearing state.

BRIEF DESCRIPTION OF THE DRAWINGS

The present disclosure will be further illustrated by way of exemplary embodiments, which will be described in detail by means of the accompanying drawings. Obviously, the drawings described below are only some embodiments of the present disclosure. For those having ordinary skills in the art, other drawings can be obtained based on these drawings without creative effort.

DETAILED DESCRIPTION

The present application is further described in detail below in conjunction with the accompanying drawings and embodiments. It is particularly noted that the following embodiments are only used to illustrate the present disclosure, but are not intended to limit the scope of the present disclosure. Similarly, the following embodiments are only some embodiments of the present disclosure rather than all embodiments, and all other embodiments obtained by those having ordinary skills in the art without creative effort are within the scope of protection of the present disclosure.

Reference to "embodiment" in the present disclosure means that a particular feature, structure or characteristic described in conjunction with the embodiment may be included in at least one embodiment of the present disclosure. It is explicitly and implicitly understood by those skilled in the art that the embodiments described in the present disclosure may be combined with other embodiments.

Figure 1:
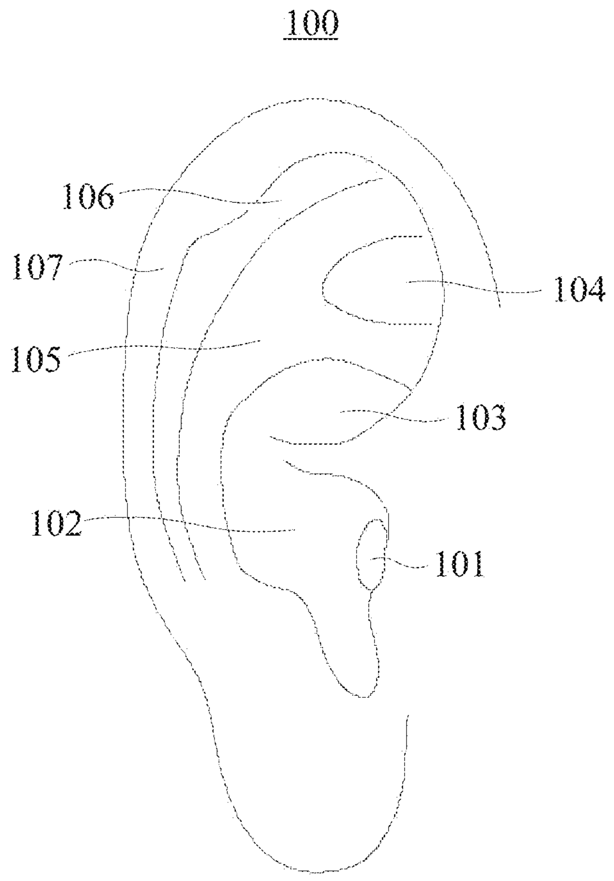
FIG. 1 is a schematic diagram illustrating a front side contour of an ear of a user according to some embodiments of the present disclosure.

Referring to FIG. 1, an ear 100 of a user may include physiological parts such as an external ear canal 101, a cavity of auricular concha 102, a cymba conchae 103, a triangular fossa 104, an antihelix 105, a scapha 106, a helix 107, etc. Although the external ear canal 101 has a certain depth and extends to an eardrum of the ear, for the convenience of description and in conjunction with FIG. 1, the external ear canal 101 specifically refers to an inlet (i.e., an ear hole) away from the eardrum in the present disclosure unless otherwise specified. Further, the cavity of auricular concha 102, the cymba conchae 103, the triangular fossa 104, and other physiological parts have a certain volume and depth; and the cavity of auricular concha 102 is directly communicated with the external ear canal 101. That is, it can be simply regarded as the ear hole is located at a bottom of the cavity of auricular concha 102.

Furthermore, different users may have individual differences, resulting in different shapes, sizes and other dimensional differences in the ear 100. For the convenience of description, and to reduce (or even eliminate) the individual differences between different users, a simulator containing a head and (left and right) ears may be made based on ANSI: S3.36, S3.25 and IEC: 60318-7 standards, such as GRAS 45BC KEMAR. Therefore, in the present disclosure, descriptions such as "the user wears the earphone" and "the earphone is in the wearing state" refer to that the earphone described in the present disclosure is worn on the ears of the simulator. Because different users have individual differences, there may be certain differences between a situation where the earphone is worn by different users and a situation where the earphone is worn on the ears of the simulator, and such differences should be tolerated.

It should be noted that in the fields of medicine and anatomy, three basic planes of a human body can be defined: a sagittal plane, a coronal plane, and a horizontal plane, and three basic axes can be defined: a sagittal axis, a coronal axis, and a vertical axis. The sagittal plane refers to a section plane perpendicular to the ground along a front-back direction of the body, which divides the human body into left and right parts. The coronal plane refers to a section plane perpendicular to the ground along a left-right direction of the body, which divides the human body into front and back parts. The horizontal plane refers to a section plane parallel to the ground along an up-down direction of the body, which divides the human body into upper and lower parts. Correspondingly, the sagittal axis refers to an axis perpendicular to the coronal plane along the front-back direction of the body. The coronal axis refers to an axis perpendicular to the sagittal plane along the left-right direction of the body. The vertical axis refers to an axis perpendicular to the horizontal plane along the up-down direction of the body. Furthermore, the "front side of the ear" described in the present disclosure is a concept relative to the "rear side of the ear". The "front side of the ear" refers to a side of the ear away from the head, and the "rear side of the ear" refers to a side of the ear facing the head, which are both for the ear of the user. By observing the ear of the simulator along a direction of the coronal axis of the human body, the schematic diagram illustrating the front side contour of the ear may be obtained as shown in FIG. 1.

Figure 2:
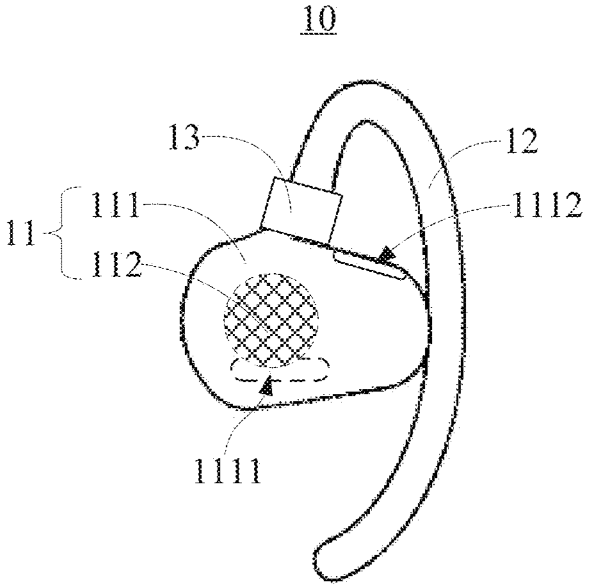
FIG. 2 is a schematic structural diagram illustrating an exemplary earphone according to some embodiments of the present disclosure.
Figure 3:
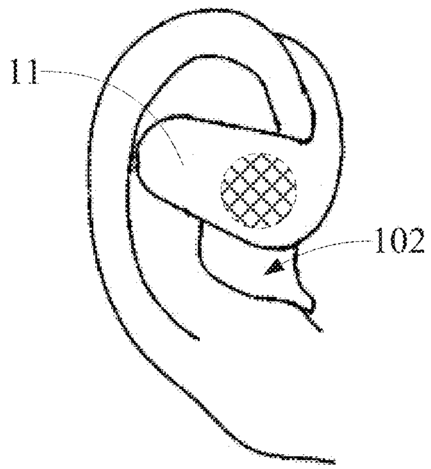
FIG. 3 is a schematic diagram illustrating an exemplary earphone worn on an ear according to some embodiments of the present disclosure.

Referring to FIGS. 2-3, an earphone 10 may include a core module 11 and a hook structure 12 connected with the core module 11. The core module 11 may be configured to contact a front side of an ear of a user. At least a portion of the hook structure 12 may be configured to be hung between a rear side of the ear and the head of the user, such that the earphone 10 may be hung on the ear of the user in a wearing state.

Further, the earphone 10 may include an adjustment mechanism 13 configured to connect the core module 11 and the hook structure 12. The adjustment mechanism 13 enables the core module 11 to at least cover a portion of a cavity of auricular concha of the ear without blocking an external ear canal of the ear in the wearing state. In this case, since the cavity of auricular concha of the ear has a certain volume and depth, the core module 11 and the cavity of auricular concha of the ear may cooperate to form an acoustic cavity. The acoustic cavity may be configured to connect a sound outlet hole of the core module 11 and the external ear canal of the ear, thereby improving the acoustic effect of the earphone 10 through the acoustic cavity. This is mainly because that in the wearing state, a sound propagated through the sound outlet hole (e.g., a sound outlet hole 1111 described below) of the core module 11 may be limited by the acoustic cavity, such that most of the sound may be propagated to the external ear canal of the ear, thereby improving the volume and sound quality of the sound heard by the user in a near field, and improving the acoustic effect of the earphone 10. Accordingly, since the earphone 10 includes the adjustment mechanism 13 configured to connect the core module 11 and the hook structure 12, different users may adjust a relative position of the core module 11 on the ear through the adjustment mechanism 13 in the wearing state, such that the core module 11 may be located at a suitable position, and the core module 11 may well cover a portion of the cavity of auricular concha of the ear without blocking the external ear canal of the ear. In addition, due to the arrangement of the adjustment mechanism 13, the user may also adjust the earphone 10 to a stable and comfortable position.

It should be noted that, compared with an in-ear earphone, the core module 11 described in the present disclosure may not block the external ear canal of the ear in the wearing state, which means that the core module 11 may not invade the external ear canal. Furthermore, since the core module 11 covers a portion of the cavity of auricular concha of the ear without blocking the external ear canal of the ear in the wearing state, the earphone 10 may not only realize an "open earphone" as the external ear canal of the user is not blocked, but also reduce a sound leakage in a far field. Reducing the sound leakage in the far field is mainly because the acoustic cavity is in a semi-open state as the core module 11 covers a portion of the cavity of auricular concha of the ear in the wearing state, such that the sound is propagated through the sound outlet hole of the core module 11, most of the sound being propagated into the external ear canal, a small portion of the sound may be propagated to the outside of the earphone 10 and the ear through a gap (e.g., another portion of the cavity of auricular concha is not covered by the core module 11) between the core module 11 and the ear, thereby forming a first sound leakage in the far field. At the same time, the core module 11 may be generally provided with a pressure relief hole (e.g., a pressure relief hole 1112 described below), and the sound propagated through the pressure relief hole may generally form a second sound leakage in the far field. A phase of the first sound leakage and a phase of the second sound leakage may be (nearly) opposite to each other, such that the first sound leakage and the second sound leakage may cancel each other out in opposite phases in the far field, thereby reducing the sound leakage of the earphone 10 in the far field.

Furthermore, in the wearing state, a free end of the core module 11 not connected with the hook structure 12 may partially extend into the cavity of auricular concha of the ear.

Figure 4:
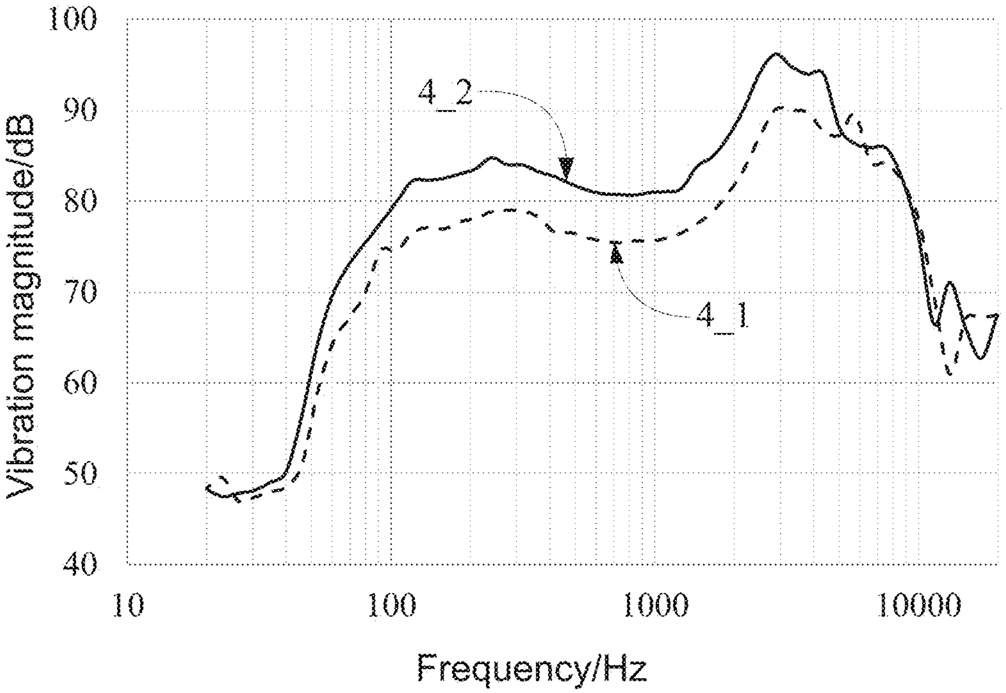
FIG. 4 is a diagram illustrating a comparison of frequency response curves measured at the same listening position when a core module in FIG. 3 is located at different positions of an ear.

Merely by way of example, referring to FIG. 4, the earphone 10 may be first worn on the simulator, then the position of the core module 11 on the ear of the simulator may be adjusted, and then a frequency response curve of the earphone 10 may be measured by a detector (e.g., a microphone) disposed in the external ear canal (e.g., the position of the eardrum, that is the listening position) of the simulator, thereby simulating the listening effect after the user wears the earphone 10. The frequency response curve may be configured to characterize a relationship between a vibration magnitude and a frequency. An abscissa of the frequency response curve represents the frequency in Hz, and an ordinate of the frequency response curve represents the vibration magnitude in dB. In FIG. 4, a curve 4_1 represents a frequency response curve when the core module 11 does not cover the cavity of auricular concha of the ear and does not block the external ear canal of the ear in the wearing state. A curve 4_2 represents a frequency response curve when the core module 11 covers a portion of the cavity of auricular concha of the ear without blocking the external ear canal of the ear in the wearing state. Accordingly, it can be directly and undoubtedly seen from the comparison diagram of the frequency response curves shown in FIG. 4 that: curve 4 2 is generally located above curve 4_1. That is, compared with the core module 11 not covering the cavity of auricular concha of the ear and not blocking the external ear canal of the ear in the wearing state, the core module 11 covering a portion of the cavity of auricular concha of the ear without blocking the external ear canal of the ear in the wearing state is conducive to improving the acoustic effect of the earphone 10.

Furthermore, the inventors of the present disclosure have found in the long-term research and development process that the adjustment mechanism 13 enables that an adjustment range of the core module relative to the hook structure is 4.5 mm, which makes the earphone 10 adapt to most users. That is to say, different users may use the adjustment mechanism 13 to make the core module 11 cover a portion of the cavity of auricular concha of the ear without blocking the external ear canal of the ear when wearing the earphone 10. The adjustment range refers to a distance between a first position of the core module 11 closest to the external ear canal of the ear and a second position of the core module 11 farthest from the external ear canal of the ear in the wearing state with the external ear canal of the ear as a reference.

For example, the core module 11 may include a core housing 111 and a transducer 112 disposed in the core housing 111. The core housing 111 may be connected with the adjustment mechanism 13 to be connected with the hook structure 12. The transducer 112 may configured to convert an electrical signal into a mechanical vibration, thereby generating sound wave (e.g., a sound audible to the human ear) after being powered on. In the wearing state, an inner wall surface of the core housing 111 facing the ear may be provided with a sound outlet hole 1111. The sound waves generated by the transducer 112 may be transmitted to the outside of the earphone 10 through the sound outlet hole 1111. Further, the transducer 112 may include a magnetic circuit system, a voice coil extending into the magnetic circuit system, and a diaphragm connected with the voice coil. A magnetic field generated by the voice coil after the voice coil is powered on may interact with a magnetic field formed by the magnetic circuit system to drive the diaphragm to generate the mechanical vibration, and then the sound may be generated through the propagation of a medium such as air. Accordingly, in the wearing state, the core housing 111 may cooperate with the cavity of auricular concha of the ear to form the acoustic cavity, and the sound outlet hole 1111 may be at least partially located in the acoustic cavity, such that most of the sound generated by the transducer and propagated through the sound outlet hole 1111 may be transmitted into the external ear canal of the ear under the limitation of the acoustic cavity.

It should be noted that in addition to being located on the inner wall surface of the core housing 111 facing the ear in the wearing state, the sound outlet hole 1111 may also be located on a lower wall surface of the core housing 111 facing away from a top of the head of the use in the wearing state, or may be located at a corner between the inner wall surface and the lower wall surface. Furthermore, the upper wall surface of the core housing 111 facing the top of the head of the use in the wearing state may be provided with a pressure relief hole 1112, such that the pressure relief hole 1112 may be farther away from the external ear canal of the ear than the sound outlet hole 1111. The pressure relief hole 1112 and the sound outlet hole 1111 may be respectively located on opposite sides of the diaphragm of the transducer 112, such that the first sound leakage and the second sound leakage may cancel each other in the opposite phases in the far field. Different from the sound outlet hole 1111, the pressure relief hole 1112 may be located on other wall surfaces (e.g., the upper wall surface) of the core housing 111 except the inner wall surface.

For example, the hook structure 12 may include an elastic metal wire and an elastic coating, and the elastic coating may at least cover a portion of the elastic metal wire. The elastic metal wire allows the hook structure 12 to deform in the wearing state. The deformation not only enables the hook structure 12 and the core module 11 to clamp the ear of the user, but also enables the hook structure 12 to better fit the rear side of the ear to generate sufficient friction, thereby meeting the requirements of stable wearing. In addition to the elastic coating provided on the hook structure 12, at least a wall surface (e.g. the inner wall surface) of the core housing 111 in contact with the skin of the user may also be provided with the elastic coating. These elastic coatings not only make the earphone 10 comfortable to wear, but also make the earphone 10 fit the skin of the user better, thereby increasing the wearing stability.

Further, the earphone 10 may include a main control circuit board and a battery. The battery and the transducer 112 may be coupled with the main control circuit board through corresponding wirings, respectively, such that the battery may supply power to the transducer 112 under the control of the main control circuit board. The main control circuit board and the battery may be respectively arranged in the core housing 111 or at the free end of the hook structure 12 not connected with the core module 11. For example, the main control circuit board may be arranged in the core housing 111, and the battery is arranged at the free end of the hook structure 12. As another example, the main control circuit board and the battery may both be arranged in the core housing 111. In other words, the free end of the hook structure 12 not connected with the core module 11 may be arranged in a compartment for accommodating the main control circuit board or the battery. The earphone 10 may include a rear hanging structure connected with the hook structure 12 or the compartment. The rear hanging structure may be configured to be arranged around the rear side of the head.

The adjustment mechanism 13 referred to in the present disclosure is illustratively described below.

Figure 5:
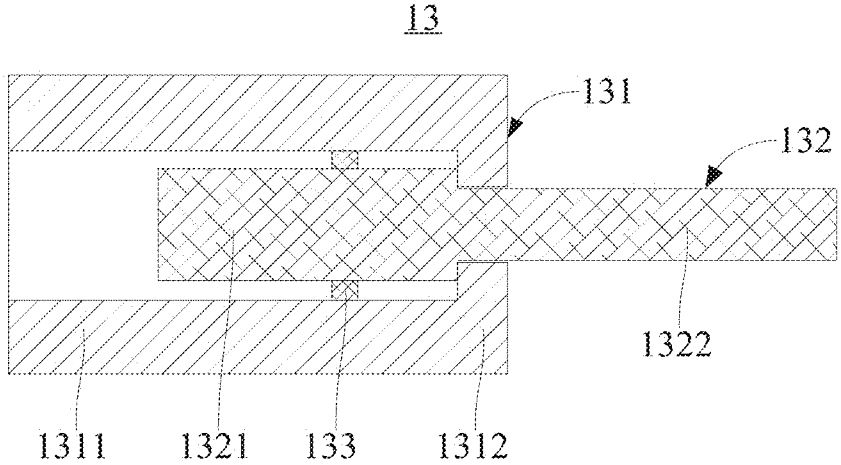
FIG. 5 is a schematic structural diagram illustrating a cross section of an exemplary adjustment mechanism according to some embodiments of the present disclosure.
Figure 6:
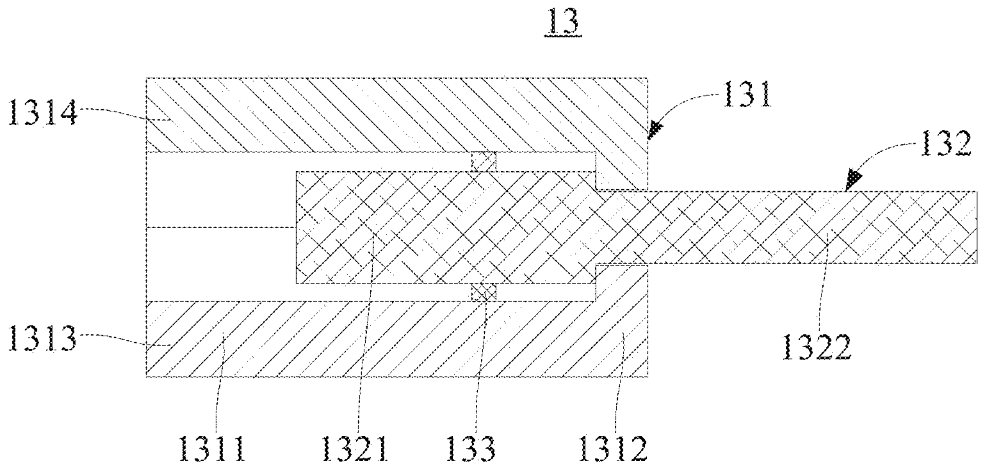
FIG. 6 is a schematic structural diagram illustrating a cross section of an exemplary adjustment mechanism according to some embodiments of the present disclosure.
Figure 7:
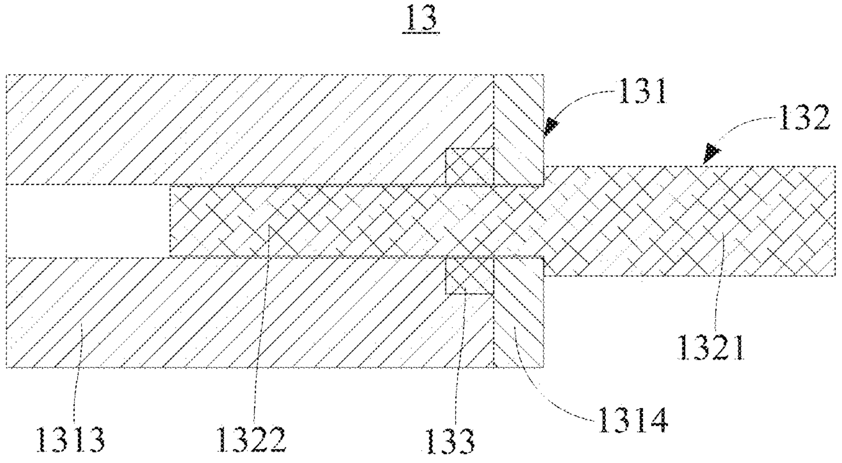
FIG. 7 is a schematic structural diagram illustrating a cross section of an exemplary adjustment mechanism according to some embodiments of the present disclosure.

Referring to FIGS. 5-7, the adjustment mechanism 13 may include a sleeve 131 and a guide rod 132. The sleeve 131 may sleeve the guide rod 132. The sleeve 131 and the guide rod 132 may be configured to move relative to each other under an action of an external force. One of the sleeve 131 and the guide rod 132 may be connected with the core module 11, and the other of the sleeve 131 and the guide rod 132 may be connected with the hook structure 12. In this way, the user may apply the external force to at least one of the core module 11 and the hook structure 12 to adjust a relative position between the core module 11 and the hook structure 12 through the adjustment mechanism 13, thereby adjusting the relative position between the core module 11 and the external ear canal of the ear in the wearing state.

It should be noted that: the sleeve 131 may be at least partially configured as a hollow structure, such that the guide rod 132 may penetrate through the sleeve 131. Correspondingly, the guide rod 132 may be a solid rod or a hollow rod, or a portion of the guide rod 132 may be a solid rod and another portion of the guide rod 132 may be a hollow rod.

Merely by way of example, the adjustment mechanism 13 may include a damping member 133. The damping member 133 may be disposed between the guide rod 132 and the sleeve 131 and may have a certain elastic deformation to provide damping when the user applies the external force to the adjustment mechanism 13, and to maintain the relative position between the guide rod 132 and the sleeve 131 after the user adjusts the adjustment mechanism 13.

Further, the guide rod 132 may be columnar, and the damping member 133 may be annular. In a natural state before the damping member 133 is assembled to the adjustment mechanism 13, a cross-sectional area of an outer wall of the guide rod 132 on a reference section perpendicular to an axial direction of the guide rod 132 may be greater than a cross-sectional area of an inner wall of the damping member 133 on the reference section. In this way, the damping member 133 may have a certain elastic deformation, and the guide rod 132 and the damping member 133 may extend into the sleeve 131. In this case, in a use state after the damping member 133 is assembled to the adjustment mechanism 13, the damping member 133 may mainly generate a stress and a strain from an inner ring surface to an outer ring surface. In some embodiments, in the natural state before the damping member 133 is assembled to the adjustment mechanism 13, the cross-sectional area of the inner wall of the sleeve 131 on the reference section may be less than the cross-sectional area of the outer wall of the damping member 133 on the reference section, and the cross-sectional area of the outer wall of the guide rod 132 on the reference section may be less than or equal to the cross-sectional area of the inner wall of the damping member 133 on the reference section. In this case, in the use state after the damping member 133 is assembled to the adjustment mechanism 13, the damping member may mainly generate a stress and a strain from the outer ring surface to the inner ring surface. In some embodiments, in the natural state before the damping member 133 is assembled to the adjustment mechanism 13, the cross-sectional area of the inner wall of the sleeve 131 on the reference section may be less than the cross-sectional area of the outer wall of the damping member 133 on the reference section, and the cross-sectional area of the outer wall of the guide rod 132 on the reference section may be greater than the cross-sectional area of the inner wall of the damping member 133 on the reference section. In this case, in the use state after the damping member 133 is assembled to the adjustment mechanism 13, the damping member may generate both the stress and the strain from the outer ring surface to the inner ring surface, and the stress and the strain from the inner ring surface to the outer ring surface.

It should be noted that: on the reference section perpendicular to the axial direction of the guide rod 132, the cross-sectional area of the outer wall of the guide rod 132 refers to an area of a closed figure enclosed by the outer wall of the guide rod 132 on the reference section, and the cross-sectional area of the inner wall of the damping member 133 refers to an area of a closed figure enclosed by the inner wall of the damping member 133 on the reference section. If cross-sectional shapes of the outer wall of the guide rod 132 and the inner wall of the damping member 133 on the reference section are regular shapes such as a circle, a rectangle, a square, etc., an outer diameter (or a side length) of the guide rod 132 and an inner diameter (or the side length) of the damping member 133 may be measured accordingly with the help of tools such as a vernier caliper, and then the corresponding cross-sectional areas may be calculated. Similarly, cross-sectional areas of an inner wall of a first tube portion 1311, an inner wall of a second tube portion 1311, and an inner wall of a first gradient structure on the reference section described below refer to areas of closed figures formed by the inner wall of the first tube portion 1311, the inner wall of the second tube portion 1311, and the inner wall of the first gradient structure on the reference section, respectively, and cross-sectional areas of an outer wall of the first rod portion 1321, an outer wall of the second rod portion 1322, and an outer wall of the second gradient structure on the reference section refer to areas of closed figures formed by the outer wall of the first rod portion 1321, the outer wall of the second rod portion 1322, and the outer wall of the second gradient structure on the reference section, respectively.

Further, the sleeve 131 may include the first tube portion 1311 and the second tube portion 1312 which are interconnected. A cross-sectional area of the inner wall of the first tube portion 1311 on the reference section perpendicular to the axial direction of the guide rod 132 may be greater than a cross-sectional area of an inner wall of the second tube portion 1312 on the reference section. The guide rod 132 may include a first rod portion 1321 and a second rod portion 1322 connected with the first rod portion 1321. A cross-sectional area of an outer wall of the first rod portion 1321 on the reference section may be greater than a cross-sectional area of an outer wall of the second rod portion 1322 on the reference section. The damping member 133 and at least a portion of the first rod portion 1321 may be located in the first tube portion 1311. The second rod portion 1322 may partially extend out of the sleeve 131 through the second tube portion 1312. At this time, the damping member 133 may sleeve the first rod portion 1321, or may be embedded in the first tube portion 1311. In this way, the guide rod 132 may move relative to the sleeve 131 under the action of the external force, the damping member 133 may also provide damping in the process, and the first rod portion 1321 and the second tube portion 1312 may stop each other such that the guide rod 132 may not be completely pulled out of the sleeve 131. Further, a cross-sectional shape of the second rod portion 1322 on the reference section perpendicular to the axial direction of the guide rod 132 may be a non-circular shape such as a square, a rectangle, an ellipse, etc., so as to prevent the guide rod 132 and the sleeve 131 from rotating relative to each other.

In some embodiments, referring to FIG. 5, the sleeve 131 may be configured as a housing structure having a through hole. A relatively thin end (e.g., the second rod portion 1322) of the guide rod 132 may sequentially penetrate through the first tube portion 1311 and the second tube portion 1312, such that the guide rod 132 may penetrate into the sleeve 131. The damping member 133 may sleeve a relatively thick end (e.g., the first rod portion 1321) of the guide rod 132 before the guide rod 132 penetrates into the sleeve 131, or may be embedded between the guide rod 132 and the sleeve 131 after the guide rod 132 penetrates into the sleeve 131. Furthermore, a free end of the first tube portion 1311 not connected with the second tube portion 1312 may be covered with a cover plate to block one end of the sleeve 131.

In some embodiments, referring to FIG. 6, the sleeve 131 may include a first housing 1313 and a second housing 1314 connected with the first housing 1313. After the first housing 1313 and the second housing 1314 are spliced, the sleeve 131 may include the first tube portion 1311 and the second tube portion 1312 which are interconnected. A parting surface between the first housing 1313 and the second housing 1314 may be parallel to an axis of the sleeve 131. For example, the parting surface may be coplanar with the axis of the sleeve 131. In this case, the damping member 133 may first sleeve the relatively thick end (e.g., the first rod portion 1321) of the guide rod 132, and then the first housing 1313 and the second housing 1314 may be spliced to clamp the guide rod 132 and the damping member 133. Furthermore, the core housing 111 may also be formed by splicing two housings, and a parting surface between the two housings and the parting surface between the first housing 1313 and the second housing 1314 may be regarded as the same parting surface. In this case, the first housing 1313 and one of the two housings may be an injection-molded integral structure, and the second housing 1314 and the other of the two housings may be another injection-molded integral structure.

In some embodiments, referring to FIG. 7, the sleeve 131 may include the first housing 1313 and the second housing 1314 connected with the first housing 1313. The first housing 1313 and the second housing 1314 may be spliced to form the sleeve 131. A parting surface between the first housing 1313 and the second housing 1314 may be perpendicular to an axis of the sleeve 131. In this case, the damping member 133 may be embedded in the first housing 1313 before the guide rod 132 penetrates into the sleeve 131, and the first housing 1313 and the second housing 1314 may be spliced before the guide rod 132 penetrates into the sleeve 131.

Figure 14:
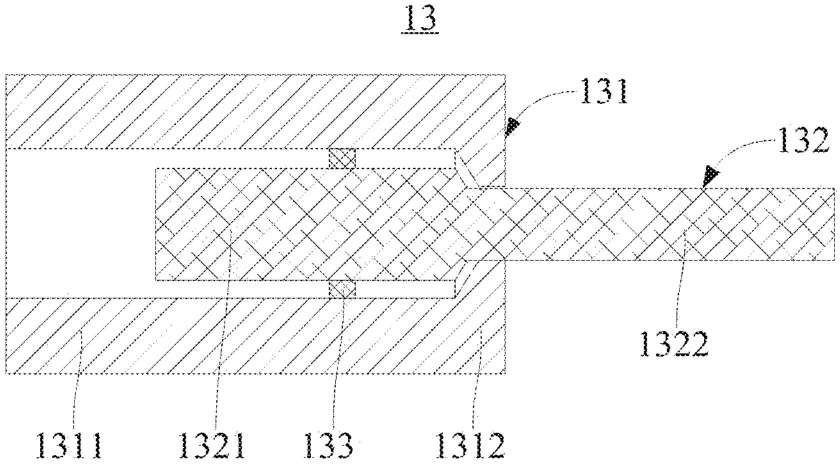
FIG. 14 is a schematic structural diagram illustrating a cross section of an exemplary adjustment mechanism according to some embodiments of the present disclosure.

In some embodiments, referring to FIG. 14, an inner wall of at least a portion of the second tube portion 1312 close to the first tube portion 1311 may be configured as a first gradual structure. For example, a cross-sectional area of an inner wall of the first gradual structure on a reference section perpendicular to an axial direction of the guide rod 132 may gradually decrease along a direction in which the guide rod 132 is pulled out. Correspondingly, a second gradual structure may be configured between the second rod portion 1322 and the first rod portion 1311. For example, a cross-sectional area of an outer wall of the second gradual structure on the reference section may gradually decrease along the direction in which the guide rod 132 is pulled out.

Figure 8:
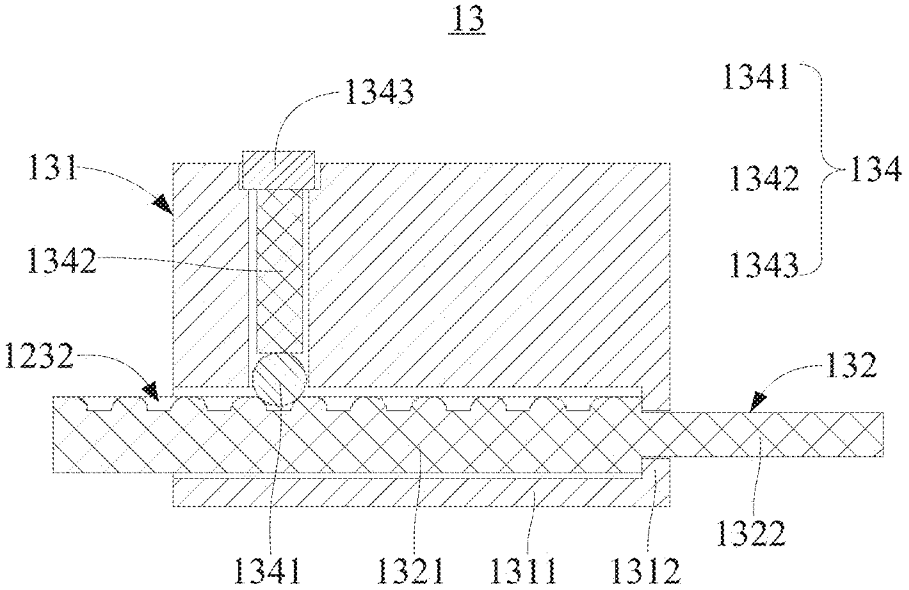
FIG. 8 is a schematic structural diagram illustrating a cross section of an exemplary adjustment mechanism according to some embodiments of the present disclosure.
Figure 9:
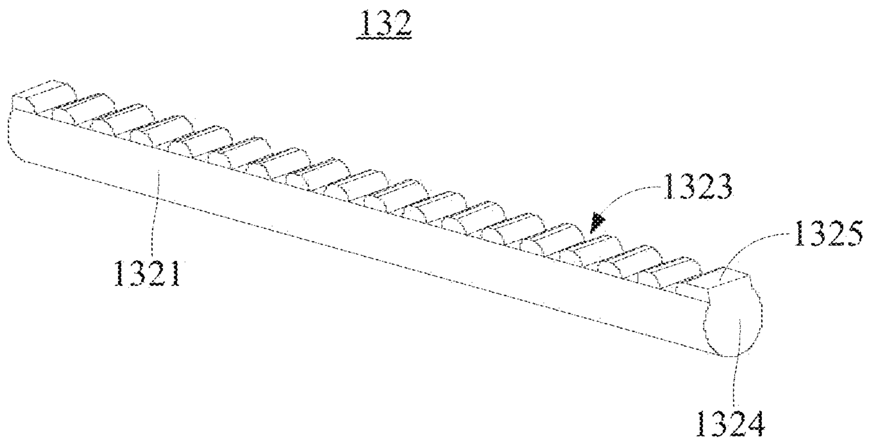
FIG. 9 is a schematic structural diagram illustrating an exemplary guide rod in FIG. 8.

Referring to FIGS. 8-9, the adjustment mechanism 13 may include the sleeve 131, the guide rod 132, and an elastic component 134. The sleeve 131 may be configured to sleeve the guide rod 132. The sleeve 131 and the guide rod 132 may be configured to move relative to each other under an action of an external force. The elastic component 134 may extend into the sleeve 131 along a direction not parallel to the axial direction of the guide rod 132. For example, the elastic component 134 may extend into the sleeve 131 along a direction perpendicular to the axial direction of the guide rod 132, and elastically abut against the guide rod 132. One of the sleeve 131 and the guide rod 132 may be connected with the core module 11, and the other of the sleeve 131 and the guide rod 132 may be connected with the hook structure 12. In this way, a user may apply the external force to at least one of the core module 11 and the hook structure 12 to adjust the relative position between the core module 11 and the hook structure 12 through the adjustment mechanism 13, thereby adjusting a relative position between the core module 11 and an external ear canal of the ear in a wearing state. Similar to the damping member 133, the elastic component 134 may provide damping when the user applies the external force to the adjustment mechanism 13, and may also maintain the relative position between the guide rod 132 and the sleeve 131 after the user adjusts the adjustment mechanism 13.

Merely by way of example, the guide rod 132 may be provided with a plurality of pits 1323. The plurality of pits 1323 may be spaced apart along the axial direction of the guide rod 132. A count of the elastic component 134 may be the same as or different from a count of the plurality of pits 1323. Further, the elastic component 134 may include a stop member 1341 and an elastic member 1342. The stop member 1341 may be supported on the elastic component 1342, such that the stop member 1341 may elastically abut against the guide rod 132 under the action of the elastic component 1342. In this case, in a relative movement process of the sleeve 131 and the guide rod 132 under the action of the external force, the stop member 1341 may partially extend into or completely withdraw from the plurality of pits 1323.

Furthermore, a wall surface of each of the plurality of pits 1323 for guiding the stop member 1341 to slide in or slide out may be an arc surface, so as to prevent the elastic component 134 and the guide rod 132 from getting stuck.

Merely by way of example, the stop member 1341 may be a rolling ball to reduce a friction resistance between the elastic component 134 and the guide rod 132, thereby extending the service life of the adjustment mechanism 13. In some embodiments, the stop member 1341 may be an ejection pin of which one end is configured as a spherical surface, and the other end is supported on the elastic member

1342, such that an end of the ejection pin with the spherical surface may elastically abut against the guide rod 132. Further, the elastic member 1342 may be a spring.

Further, the elastic component 134 may include a cover plate 1343. A mounting groove may be provided on the sleeve 131. The stop member 1341 and the elastic member 1342 may be disposed in the mounting groove, and the stop member 1341 may partially extend out of the mounting groove to elastically abut against the guide rod 132. The cover plate 1343 may be configured to cover an end of the mounting groove away from the stop member 1341, i.e., one end of the elastic member 1342 away from the stop member 1341 may be supported on the cover plate 1343. In this way, if the elastic component 134 is mounted, after the guide rod 132 penetrates into the sleeve 131, the stop member 1341 and the elastic member 1342 may be successively disposed in the mounting groove of the sleeve 131, and then the cover plate 1343 may be fixed on the sleeve 131 to cover the mounting groove, such that the elastic member 1342 may be elastically supported between the stop member 1341 and the cover plate 1343.

In some embodiments, similar to the structure of any sleeve 131 in FIG. 5, FIG. 7, and FIG. 14, the sleeve 131 may include the first tube portion 1311 and the second tube portion 1312 which are interconnected. A cross-sectional area of the inner wall of the first tube portion 1311 on a reference section perpendicular to an axial direction of the guide rod 132 may be greater than a cross-sectional area of the inner wall of the second tube portion 1312 on the reference section. The guide rod 132 may include the first rod portion 1321 and the second rod portion 1322 connected with the first rod portion 1321. A cross-sectional area of an outer wall of the first rod portion 1321 on the reference section may be greater than a cross-sectional area of an outer wall of the second rod portion 1322 on the reference section. Correspondingly, the first tube portion 1311 may be provided with the mounting groove. The first rod portion 1321 may be at least partially located in the first tube portion 1311, and the second rod portion 1322 may partially extend out of the sleeve 131 through the second tube portion 1312. The stop member 1341 may elastically abut against the first rod portion 1321, and the plurality of pits 1323 may be provided on the first rod portion 1321. In this way, the guide rod 132 may move relative to the sleeve 131 under an action of an external force, and the elastic component 134 may also provide damping in this process, and the first rod portion 1321 and the second tube portion 1312 may stop each other such that the guide rod 132 may not be completely pulled out of the sleeve 131. Similarly, a cross-sectional shape of the second rod portion 1322 on the reference section perpendicular to the axial direction of the guide rod 132 may be a non-circular shape such as a square, a rectangle, an ellipse, etc., so as to prevent the guide rod 132 and the sleeve 131 from rotating relative to each other.

In some embodiments, similar to the structure of any sleeve 131 in FIG. 5, FIG. 7, and FIG. 14, the sleeve 131 may include the first tube portion 1311 and the second tube portion 1312 which are interconnected, the cross-sectional area of the inner wall of the first tube portion 1311 on the reference section perpendicular to the axial direction of the guide rod 132 may be greater than the cross-sectional area of the inner wall of the second tube portion 1312 on the reference section. The guide rod 132 may include the first rod portion 1321 and the second rod portion 1322 connected with the first rod portion 1321, and the cross-sectional area of the outer wall of the first rod portion 1321 on the reference section may be greater than the cross-sectional area of the outer wall of the second rod portion 1322 on the reference section. Accordingly, the first tube portion 1311 may be provided with the mounting groove. The first rod portion 1321 may be at least partially located in the first tube portion 1311, and the second rod portion 1322 may partially extend out of the sleeve 131 through the second tube portion 1312. Further, referring to FIG. 9, the first rod portion 1321 may include a columnar body portion 1324 and a strip-shaped step portion 1325. The strip-shaped step portion 1325 may make a cross-sectional shape of the first rod portion 1321 on the reference section perpendicular to the axial direction of the guide rod 132 non-circular, which not only prevents the guide rod 132 and the sleeve 131 from rotating relative to each other, but also makes a cross-sectional shape of the second rod portion 1322 on the reference section perpendicular to the axial direction of the guide rod 132 circular. In addition, compared with directly machining the plurality of pits 1323 on the columnar first rod portion 1321, machining the plurality of pits 1323 on the non-columnar first rod portion 1321 may be less difficult, mainly because the strip-shaped step portion 1325 may provide a plane for machining the plurality of pits 1323. That is, the strip-shaped step portion 1325 may transform a peripheral side surface of the first rod portion 1321 from the arc surface to the plane. In this case, the stop member 1341 may elastically abut against the strip-shaped step portion 1325, and the plurality of pits 1323 may be disposed on the strip-shaped step portion 1325.

The same or similar to the embodiment as shown in FIG. 5 or FIG. 6 is that in the embodiment shown in FIGS. 8-9, the sleeve 131 may be configured as a housing structure with a through hole, or may include the first housing 1313 and the second housing 1314 connected with the first housing 1313. A parting surface between the first housing 1313 and the second housing 1314 may be parallel to an axis of the sleeve 131. For example, the parting surface may be coplanar with the axis of the sleeve 131. When the sleeve 131 includes the first housing 1313 and the second housing 1314 connected with the first housing 1313, the mounting groove may be provided on the first housing 1313 or the second housing 1314.

Accordingly, the sleeve 131 may be connected with the core housing 111. For example, the first housing 1313 and the second housing 1314 may be respectively used as a portion of the core housing 111. The guide rod 132 may be connected with an elastic metal wire. For example, the elastic metal wire may be partially embedded in the second rod portion 1322, and may also be used as a portion of the hook structure 12.

Referring to FIGS. 10-13, the adjustment mechanism 13 may include a driving member 135 and a driven member 136. The driven member 136 may be meshed with the driving member 135. The driving member 135 may rotate around a preset axis under an external force applied by a user, and drive the driven member 136 to move along the preset axis. One of the core module 11 and the hook structure 12 may be connected with the driving member 135, and the other of the core module 11 and the hook structure 12 may be connected with the driven member 136. In this way, when the user applies the external force to the driving member 135, the hook structure 12 and the core module 11 may move relative to each other through the adjustment mechanism 13, thereby adjusting the relative position between the core module 11 and the external ear canal of the ear in the wearing state.

Figure 10:
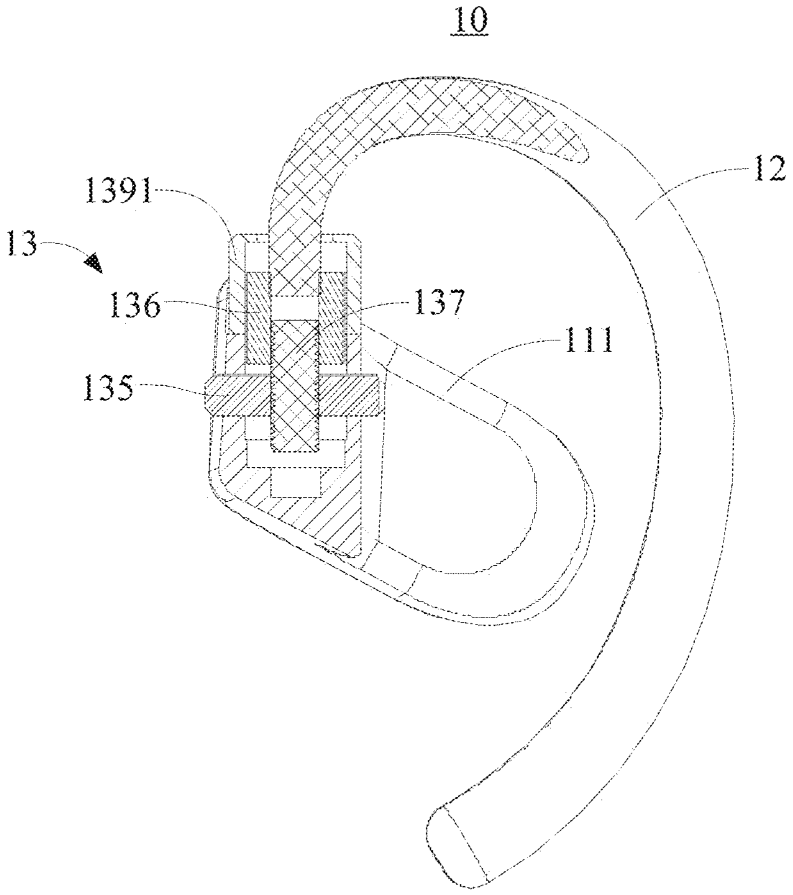
FIG. 10 is a schematic structural diagram illustrating a cross section of an exemplary adjustment mechanism according to some embodiments of the present disclosure.

In some embodiments, referring to FIG. 10, the adjustment mechanism 13 may include a lead screw 137. The driving member 135 and the driven member 136 may respectively sleeve the lead screw 137. The driving member 135 may be meshed with the lead screw 137 through a third thread pair, and the lead screw 137 may be meshed with the driven member 136 through a fourth thread pair. The preset axis may be an axis of the lead screw 137. In this case, the driving member 135 may be configured to rotate only around the preset axis relative to the core module 11, the driven member 136 may be configured to move only along the preset axis relative to the core module 11, and the hook structure 12 may be configured to maintain the relative position constant with the driven member 136.

Figure 11:
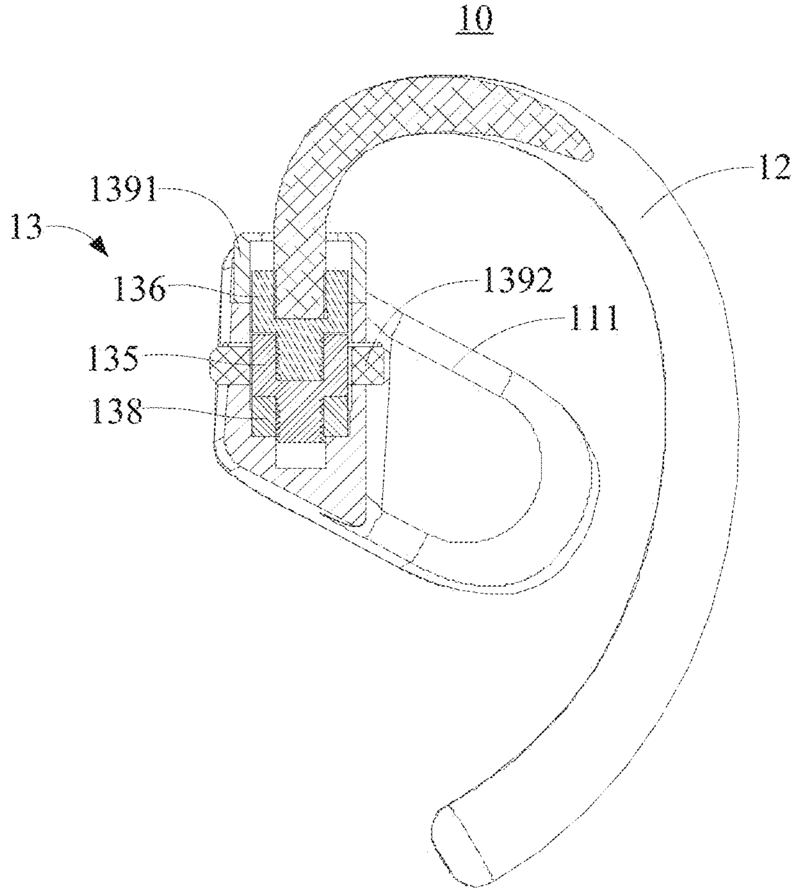
FIG. 11 is a schematic structural diagram illustrating a cross section of an exemplary adjustment mechanism according to some embodiments of the present disclosure.
Figure 12:
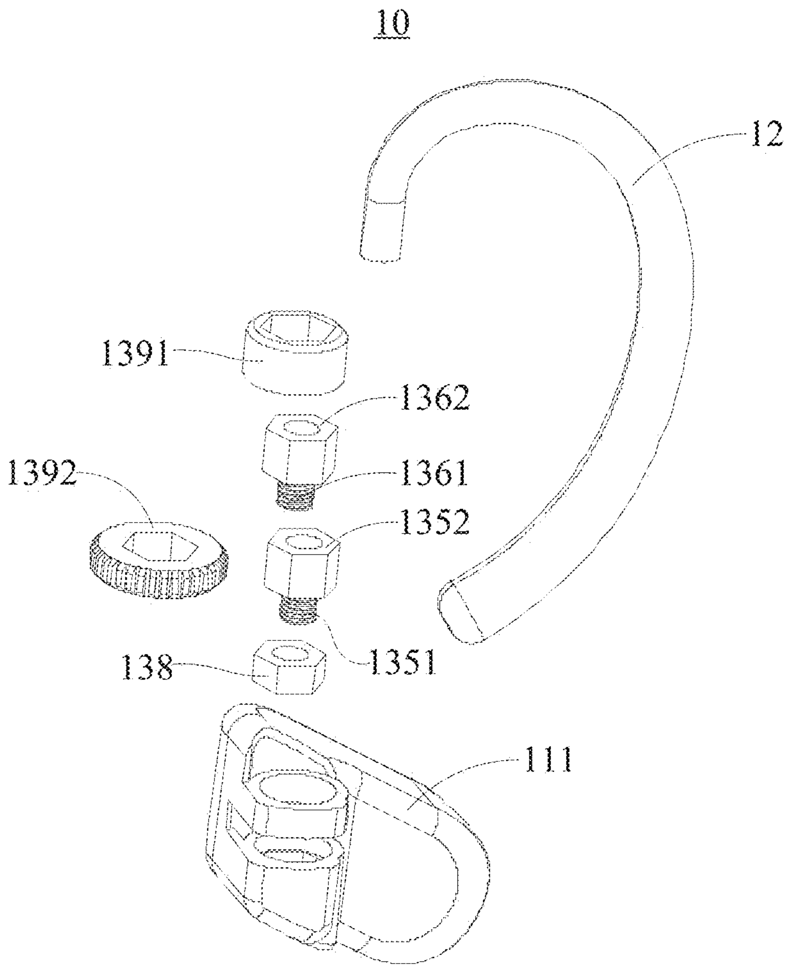
FIG. 12 is a schematic diagram illustrating a disassembled structure of an exemplary adjustment mechanism in FIG. 11.
Figure 13:
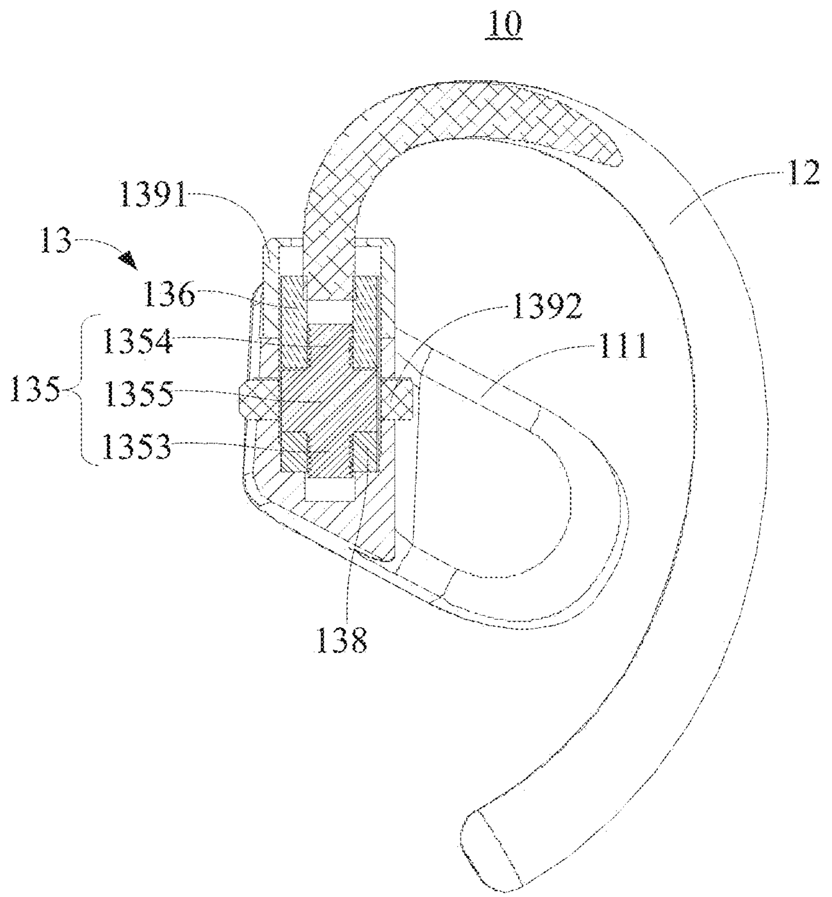
FIG. 13 is a schematic structural diagram illustrating a cross section of an exemplary adjustment mechanism according to some embodiments of the present disclosure.

In some embodiments, referring to FIGS. 11-13, the adjustment mechanism 13 may include a fixed member 138 and a guide member 1391. The fixed member 138 may be meshed with the driving member 135 through a first thread pair, and the driving member 135 may be meshed with the driven member 136 through a second thread pair. A rotation direction of first threads of the first thread pair and a rotation direction of second threads of the second thread pair may be opposite. The guide member 1391 may sleeve the driven member 136. An inner contour of the guide member 1391 and an outer contour of the driven member 136 may be matched non-circular shapes to allow the driven member 136 to be driven to move along the preset axis by the driving member 135. The non-circular shapes may include any one of regular shapes such as a rectangle, a square, a regular hexagon, an ellipse, etc., or other irregular shapes. The preset axis may be an axis of the driving member 135. In this way, when a user applies an external force to the driving member 135, if the driving member 135 moves along the preset axis and approaches the fixed member 138, the driven member 136 may also move along the preset axis and approach the driving member 135 synchronously; conversely, if the driving member 135 moves along the preset axis and moves away from the fixed member 138, the driven member 136 may also move along the preset axis and move away from the driving member 135 synchronously, thereby greatly increasing the adjustment efficiency of the adjustment mechanism 13. In this case, one of the core module 11 and the hook structure 12 may maintain a relative position constant with the fixed member 138 and the guide member 1391, and the other of the core module 11 and the hook structure 12 may maintain a relative position constant with the driven member 136.

Merely by way of example, referring to FIGS. 11-12, the driving member 135 may include a first external threaded portion 1351 and an internal threaded portion 1352 connected with the first external threaded portion 1351. A cross-sectional area of an outer wall of the first external threaded portion 1351 on a reference section perpendicular to the preset axis may be less than a cross-sectional area of an outer wall of the internal threaded portion 1352 on the reference section, i.e., the internal threaded portion 1352 may be thicker than the first external threaded portion 1351. The driven member 136 may include a second external threaded portion 1361 and a guide portion 1362 connected with the second external threaded portion 1361. A cross-sectional area of an outer wall of the second external threaded portion 1361 on the reference section may be less than a cross-sectional area of an outer wall of the guide portion 1362 on the reference section, i.e., the guide portion 1362 may be thicker than the second external threaded portion 1361. The first external threaded portion 1351 may be meshed with the fixed member 138 through the first thread pair, and the second external threaded portion 1361 may be meshed with the internal threaded portion 1352 through the second thread pair. The outer contour of the guide portion 1362 and the inner contour of the guide member 1391 may be matched non-circular shapes. The guide member 1391 may sleeve the guide portion 1362. Further, the driving member 135 and the driven member 136 may be structural members with the same structure.

For example, referring to FIG. 13, the driving member 135 may include a third external threaded portion 1353, a fourth external threaded portion 1354, and a transition portion 1355. The transition portion 1355 may be configured to connect the third external threaded portion 1353 and the fourth external threaded portion 1354. The third external threaded portion 1353 may be meshed with the fixed member 138 through the first thread pair, and the fourth external threaded portion 1354 may be meshed with the driven member 136 through the second thread pair.

Further, the adjustment mechanism 13 may include a rotating wheel 1392. The rotating wheel 1392 may sleeve the driving member 135 (specifically, the internal threaded portion 1352 or the transition portion 1355), and may be configured to replace the driving member 135 to receive the external force applied by the user. An inner contour of the rotating wheel 1392 and an outer contour of the driving member 135 may be matched non-circular shapes. The non-circular shapes may include any one of regular shapes such as a rectangle, a square, a regular hexagon, an ellipse, or other irregular shapes, so as to allow the driving member 135 to rotate around the preset axis following the rotating wheel 1392, and allow the driving member 135 to move relative to the rotating wheel 1392 along the preset axis. In other words, when the user applies the external force to the rotating wheel 1392, the driving member 135 may synchronously rotate around the preset axis relative to the fixed member 138 and move relative to the fixed member 138 along the preset axis.

It should be noted that: in the embodiment shown in FIG. 13, a cross-sectional area of an outer wall of the transition portion 1355 on the reference section perpendicular to the preset axis may be respectively greater than the cross-sectional area of the outer wall of the third external threaded portion 1353 on the reference section and the cross-sectional area of the outer wall of the fourth external threaded portion 1354 on the reference section. When any one of the fixed member 138 and the driven member 136 abuts against the transition portion 1355 along the preset axis, the adjustment mechanism 13 may be axially limited. The cross-sectional area of the outer wall of the transition portion 1355 on the reference section may also be respectively less than or equal to the cross-sectional area of the outer wall of the third external threaded portion 1353 on the reference section and the cross-sectional area of the outer wall of the fourth external threaded portion 1354 on the reference section. When any one of the fixed member 138 and the driven member 136 abuts against the rotating wheel 1392 along the preset axis, the adjustment mechanism 13 may be axially limited.

It should be noted that: on the reference section perpendicular to the preset axis, the cross-sectional areas of the outer wall of the first external threaded portion 1351, the outer wall of the internal threaded portion 1352, the outer wall of the second external threaded portion 1361, and the outer wall of the guide portion 1362 respectively refer to areas of closed figures enclosed by the outer wall of the first external threaded portion 1351, the outer wall of the internal threaded portion 1352, the outer wall of the second external threaded portion 1361, and the outer wall of the guide portion 1362 on the reference section. Since the cross-sectional shapes of the outer wall of the first external threaded portion 1351 and the outer wall of the second external threaded portion 1361 on the reference section are generally circles, outer diameters of the first external threaded portion 1351 and the second external threaded portion 1361 may be measured accordingly with the help of tools such as a vernier caliper, and the corresponding cross-sectional areas may be calculated. Since the cross-sectional shapes of the outer wall of the internal threaded portion 1352 and the outer wall of the guide portion 1362 on the reference section are generally non-circular shapes such as a square or a regular hexagon, side lengths of the internal threaded portion 1352 and the guide portion 1362 may be measured accordingly with the help of tools such as the vernier caliper, and the corresponding cross-sectional areas may be calculated. Similarly, the cross-sectional areas of the outer wall of the transition portion 1355, the outer wall of the third external threaded portion 1353, and the outer wall of the fourth external threaded portion 1354 on the reference section respectively refer to areas of closed figures enclosed by the outer wall of the transition portion 1355, the outer wall of the third external threaded portion 1353, and the outer wall of the fourth external threaded portion 1354 on the reference section.

Based on the above related description, in the embodiment shown in FIG. 10, the guide member 1391 may be connected with the core housing 111; the driven member 136 may be connected with the elastic metal wire (e.g., the elastic metal wire may be partially embedded in the driven member 136); the driving member 135 may be clamped by two limiting portions on the core housing 111 spaced apart along the preset axis. In any embodiment shown in FIGS. 11-13, the fixed member 138 and the guide member 1391 may be connected with the core housing 111, respectively; the driven member 136 may be connected with the elastic metal wire (e.g., the elastic metal wire may be partially embedded in the driven member 136); the rotating wheel 1392 may be clamped by the two limiting portions on the core housing 111 spaced apart along the above preset axis.

The above descriptions are only some embodiments of the present disclosure, and do not limit the protection scope of the present disclosure. Any equivalent device or equivalent process transformation made using the contents of the specification and drawings of the present disclosure, or directly or indirectly used in other related technical fields, are also included in the patent protection scope of the present disclosure.

What is claimed is:

1. An earphone, comprising a core module, a hook structure, and an adjustment mechanism, wherein the core module is configured to contact a front side of an ear of a user, at least a portion of the hook structure is configured to be hung between a rear side of the ear and the head of the user, and the adjustment mechanism is configured to connect the core module and the hook structure; wherein the adjustment mechanism enables the core module to cover at least a portion of a cavity of auricular concha of the ear without blocking an external ear canal of the ear in a wearing state, in the wearing state, a free end of the core module extends into the cavity of auricular concha of the ear, so as to allow the core module to cooperate with the cavity of auricular concha of the ear to form an acoustic cavity, the acoustic cavity being configured to connect a sound outlet hole of the core module and the external ear canal of the ear.

2. The earphone of claim 1, wherein the adjustment mechanism enables that an adjustment range of the core module relative to the hook structure is 4.5 mm.

3. The earphone of claim 1, wherein the core module includes a core housing and a transducer, the core housing is connected with the adjustment mechanism, an inner wall surface of the core housing facing the ear in the wearing state is provided with the sound outlet hole, the transducer is disposed in the core housing, and sound waves generated by the transducer are transmitted to the outside of the earphone through the sound outlet hole; wherein in the wearing state, the core housing cooperates with the cavity of auricular concha of the ear to form the acoustic cavity, and the sound outlet hole is at least partially located in the acoustic cavity.

4. The earphone of claim 1, wherein the adjustment mechanism includes a sleeve and a guide rod, the sleeve sleeves on the guide rod, the sleeve and the guide rod are configured to move relative to each other under an action of an external force, one of the sleeve and the guide rod is connected with the core module, and the other of the sleeve and the guide rod is connected with the hook structure.

5. The earphone of claim 4, wherein the adjustment mechanism includes a damping member, and the damping member is disposed between the guide rod and the sleeve.

6. The earphone of claim 5, wherein the damping member is annular, and in a natural state before the damping member is assembled to the adjustment mechanism, a cross-sectional area of an outer wall of the guide rod on a reference section perpendicular to an axial direction of the guide rod is greater than a cross-sectional area of an inner wall of the damping member on the reference section.

7. The earphone of claim 5, wherein the sleeve includes a first tube portion and a second tube portion which are interconnected, a cross-sectional area of an inner wall of the first tube portion on a reference section perpendicular to an axial direction of the guide rod is greater than a cross-sectional area of an inner wall of the second tube portion on the reference section, the guide rod includes a first rod portion and a second rod portion connected with the first rod portion, a cross-sectional area of an outer wall of the first rod portion on the reference section is greater than a cross-sectional area of an outer wall of the second rod portion on the reference section, a cross-sectional shape of the outer wall of the second rod portion on the reference section is non-circular, the damping member and at least a portion of the first rod portion are located in the first tube portion, and a portion of the second rod portion extends out of the sleeve through the second tube portion.

8. The earphone of claim 7, wherein the sleeve includes a first housing and a second housing connected with the first housing, and a parting surface between the first housing and the second housing is parallel to an axis of the sleeve.

9. The earphone of claim 4, wherein the adjustment mechanism includes an elastic component, the elastic component extends into the sleeve along a direction not parallel to an axial direction of the guide rod and elastically abuts against the guide rod.

10. The earphone of claim 9, wherein the guide rod is provided with a plurality of pits, the plurality of pits are spaced apart along the axial direction of the guide rod, the elastic component includes a stop member and an elastic member, the stop member is supported on the elastic member, the stop member elastically abuts against the guide rod under an action of the elastic member, and in a relative movement process of the sleeve and the guide rod under the action of the external force, the stop member partially extends into or completely withdraws from the plurality of pits.

11. The earphone of claim 10, wherein a wall surface of each of the plurality of pits for guiding the stop member to slide in or slide out is an arc surface.

12. The earphone of claim 10, wherein the sleeve includes a first tube portion and a second tube portion which are interconnected, a cross-sectional area of an inner wall of the first tube portion on a reference section perpendicular to the axial direction of the guide rod is greater than a cross-sectional area of an inner wall of the second tube portion on the reference section, the first tube portion is provided with a mounting groove, the elastic component is fixed in the mounting groove, the guide rod includes a first rod portion and a second rod portion connected with the first rod portion, a cross-sectional area of an outer wall of the first rod portion on the reference section is greater than a cross-sectional area of an outer wall of the second rod portion on the reference section, the first rod portion is at least partially located in the first tube portion, the second rod portion partially extends out of the sleeve through the second tube portion, the first rod portion includes a columnar body portion and a strip-shaped step portion, the strip-shaped step portion makes a cross-sectional shape of the first rod portion on the reference section non-circular, the stop member elastically abuts against the strip-shaped step portion, and the plurality of pits are disposed on the strip-shaped step portion.

13. The earphone of claim 10, wherein the sleeve includes a first tube portion and a second tube portion which are interconnected, a cross-sectional area of an inner wall of the first tube portion on a reference section perpendicular to the axial direction of the guide rod is greater than a cross-sectional area of an inner wall of the second tube portion on the reference section, the first tube portion is provided with a mounting groove, the elastic component is fixed in the mounting groove, the guide rod includes a first rod portion and a second rod portion connected with the first rod portion, a cross-sectional area of an outer wall of the first rod portion on the reference section is greater than a cross-sectional area of an outer wall of the second rod portion on the reference section, a cross-sectional shape of the second rod portion on the reference section is non-circular, the first rod portion is at least partially located in the first tube portion, the second rod portion partially extends out of the sleeve through the second tube portion, the stop member elastically abuts against the first rod portion, and the plurality of pits are disposed on the first rod portion.

14. The earphone of claim 1, wherein the adjustment mechanism includes an driving member and a driven member, the driven member is meshed with the driving member, the driving member rotates around a preset axis under an external force applied by the user, and drives the driven member to move along the preset axis, one of the core module and the hook structure is connected with the driving member, and the other of the core module and the hook structure is connected with the driven member.

15. The earphone of claim 14, wherein the adjustment mechanism includes a fixed member and a guide member, the fixed member is meshed with the driving member through a first thread pair, the driving member is meshed with the driven member through a second thread pair, a rotation direction of first threads of the first thread pair and a rotation direction of second threads of the second thread pair are opposite, the guide member sleeves the driven member, an inner contour of the guide member and an outer contour of the driven member are matched non-circular shapes to allow the driven member to be driven to move along the preset axis by the driving member, one of the core module and the hook structure maintains a relative position constant with the fixed member and the guide member, and the other of the core module and the hook structure maintains a relative position constant with the driven member.

16. The earphone of claim 15, wherein the driving member includes a first external threaded portion and an internal threaded portion connected with the first external threaded portion, a cross-sectional area of an outer wall of the first external threaded portion on a reference section perpendicular to the preset axis is less than a cross-sectional area of an outer wall of the internal threaded portion on the reference section, the driven member includes a second external threaded portion and a guide portion connected with the second external threaded portion, a cross-sectional area of an outer wall of the second external threaded portion on the reference section is less than the cross-sectional area of the outer wall of the internal threaded portion on the reference section, the first external threaded portion is meshed with the fixed member through the first thread pair, the second external threaded portion is meshed with the internal threaded portion through the second thread pair, the outer contour of the guide portion and the inner contour of the guide member are matched non-circular shapes, and the guide member sleeves the guide portion.

17. The earphone of claim 15, wherein driving member includes a third external threaded portion, a fourth external threaded portion, and a transition portion, the transition portion is configured to connect the third external threaded portion and the fourth external threaded portion, the third external threaded portion is meshed with the fixed member through the first thread pair, and the fourth external threaded portion is meshed with the driven member through the second thread pair.

18. The earphone of claim 15, wherein the adjustment mechanism includes a rotating wheel, the rotating wheel sleeves the driving member and is configured to receive the external force applied by the user, and an inner contour of the rotating wheel and an outer contour of the driving member are matched non-circular shapes to allow the driving member to rotate around the preset axis following the rotating wheel and allow the driving member to move relative to the rotating wheel along the preset axis.

19. The earphone of claim 14, wherein the adjustment mechanism includes a lead screw, the driving member and the driven member respectively sleeve the lead screw, the driving member is meshed with the lead screw through a third thread pair, and the lead screw is meshed with the driven member through a fourth thread pair.

20. The earphone of claim 1, wherein the adjustment range refers to a distance between a first position of the core module closest to the external ear canal of the ear and a second position of the core module farthest from the external ear canal of the ear, in the wearing state with the external ear canal of the ear as a reference.

* * * * *